June 21, 1966  P. GRAHAM  3,256,607
DRAFTING MACHINE Filed Jan. 28, 1964  3 Sheets-Sheet 1

Inventor.
PHILLIP GRAHAM
By William J. Ruano
Attorney

Inventor.
PHILLIP GRAHAM

United States Patent Office 3,256,607
Patented June 21, 1966

3,256,607
DRAFTING MACHINE
Phillip Graham, 2825 Glenmore Ave., Pittsburgh, Pa.
Filed Jan. 28, 1964, Ser. No. 343,179
30 Claims. (Cl. 33—32)

This invention relates to a drafting machine which is useful, in general, as a means for aiding in engineering drawing work, so as to quickly and accurately measure and draw straight lines, including sloped lines. This application is a continuation-in-part of my copending application, Ser. No. 806,963, filed April 16, 1959, now Patent No. 3,120,060, entitled Graphic Machine. Applicant also claims rights to earlier filing dates to common subject matters that are described in the present application, which were also described in his application Ser. No. 364,674, filed June 29, 1953, entitled Graphic Machine, now Patent No. 2,882,604. Application Ser. No. 806,963 was a continuation-in-part of application Ser. No. 364,674.

The drafting machine of the present invention differs from the L-shaped square drafting machine described in my copending application Ser. No. 806,963, by having an adjustable spacer means projecting from the L-shaped square and selectively clamped to a straight edge, so as to allow selective spacing of cross hatching lines and surface shading lines. The spacer means, along with the index arm, allows oppositely sloped sets of such lines, also horizontal and vertical shading lines, to be drawn rapidly with ease. Furthermore, the present invention has improvements in the carriage, including a low cost automatic tilted marker means that allows such cross hatch lines and shading lines to be uniformly drawn to any selective thickness automatically with a tilted rotating marker that is selectively pivoted laterally to vary the width of lines. The marker is automatically rotated as it is coupled to a drive wheel that bears and rotates against edge of the L-shaped square when the carriage is moved. The rotating action of a pencil lead marker dresses or self-sharpens the tip of the marker continuously as it is used, maintaining a blunt conical shaped tip which can be pushed or pulled without snagging into a drawing. In addition, the improved carriage has a rotating automatic scale that is coupled to the drive wheel that bears and rotates against an edge of the L-shaped square when the carriage is moved. The rotating scale allows scaling in either direction from any intermediate position along the L-shaped square, thus the rotating scale and the snagproof marker coact to allow drawing action without deadheading to a zero point on a scaled edge of the square. Another improvement in the carriage is a means to selectively switch and position the automatic marker and the automatic rotating scale from an inside edge of the scale to an outside edge and vice versa, so that when the L-shaped square is positioned like a conventional drafting machine, a right-handed draftsman may use the conventional system of drawing along the upper edge of the horizontal leg of the square and along the outside or left edge of the vertical leg of the square. The improved drafting machine has removable offsets which have means to couple the index arm, bearing pins and clamps to the body of the L-shaped square. The offsets may be removed to allow the carriage marker to be used to draw along the full lengths of the outside edges of the square, thus allowing the draftsman to use the machine to make a drawing which has long sketch portions made with one scale and small detail portions made to a larger scale. The removable offset improvement is also a means to allow the conventional drawing action along the top edge of the horizontal leg of the square and along the left edge of the vertical leg of the square.

The present invention is an improvement over the complex graphic machines described in my Patents No. 2,701,417, and No. 3,020,640. The present device is far more simple in construction and thus less costly to manufacture. The present device could be operated manually with far less effort than could the complex machines because there is no beam to push and no intricate locking mechanism to operate for directional movement.

An object of the present invention is to provide an L-shaped square drafting machine having a novel adjustable spacer arm that can be selectively clamped to a straight edge, to allow cross hatch and shading lines to be spaced easily and quickly.

Another object of the invention is to provide a novel L-shaped square drafting machine having a carriage mounted on it, the carriage having an automatic rotating scale that is rotated by means of a driving wheel that bears against the edge of the square.

A still further object of the invention is to provide an L-shaped square drafting machine having a carriage mounted on it which has an automatic tilted marker that is coupled to a driving wheel that bears and rotates against the edge of the square when the carriage is moved, the marker being pivotable laterally to make selective width lines.

A still further object of my invention is to provide a drafting machine having a carriage mounted on it, and an automatic marker mounted on the carriage being transferable from a position adjacent to the inside of the square to a position adjacent to the outside edge and vice versa.

A still further object of my invention is to provide a novel L-shaped drafting machine which is readily attachable to a conventional drafting machine so as to enable the machine to be used to selectively measure and draw more rapidly and accurately.

A still further object of my invention is to provide a novel L-shaped drafting machine that is simpler to operate, simpler in construction, and less costly to manufacture.

Other objects and advantages of my invention will become more apparent from a study of the following description taken with the accompanying drawings wherein.

Figures 1A, 1B, 1C, 1D, 1E, 1F, 2:
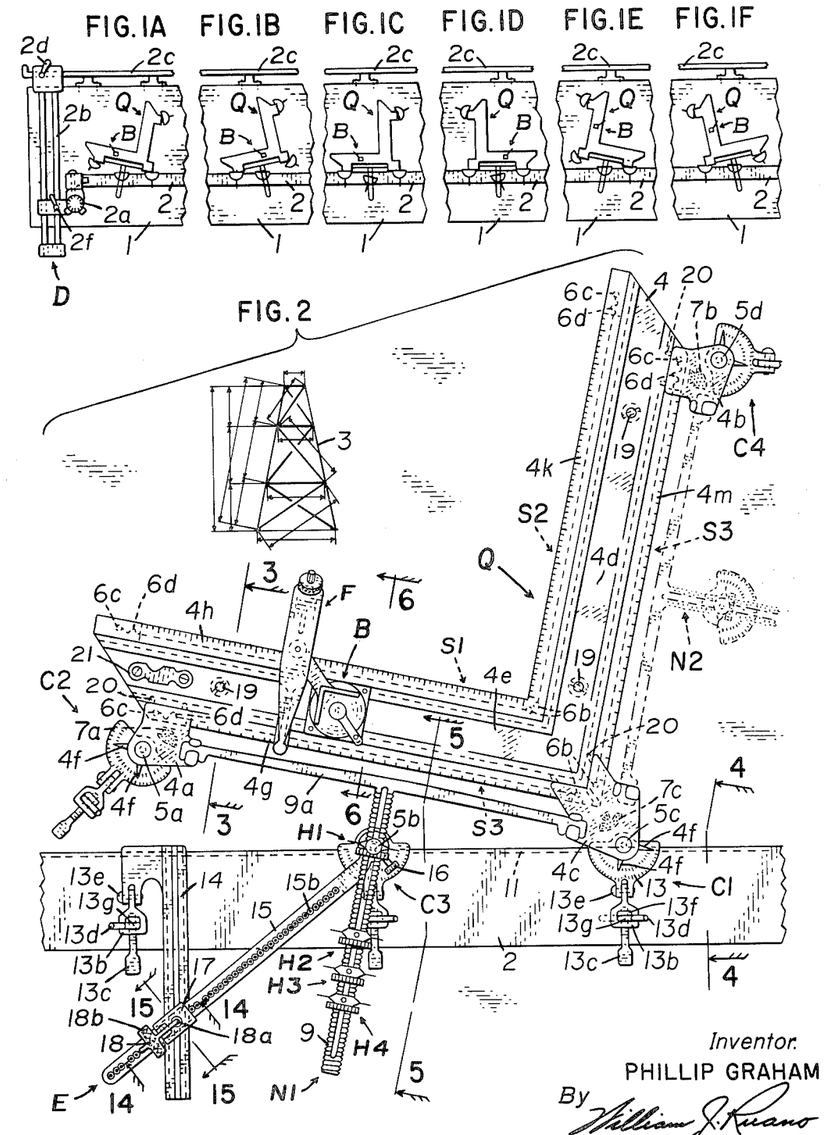
FIGURE 1A is a fragmentary plan view of a drawing board with the drafting machine embodying the principles of this invention, positioned thereon in one of its many working positions.
FIGURES 1B to 1F, inclusive, show fragmentary plan views of a drawing board with the drafting machine illustrated in some of the possible positions other than that shown in FIG. 1A.
FIGURE 2 is an enlarged fragmentary plan view with the drafting machine positioned the same as in FIG. 1A showing in detail some of the principles of the drafting machine embodied in this invention.

Referring more particularly to FIG. 1A, the drawing board 1 has a conventional-like drafting machine D mounted on it. The board 1 may be made of any suitable material, including steel, wood, plastics, and glass. The machine D has a straight edge 2 to which is attached the square or L-shaped square Q, which embodies many of the principles that are new and useful. The L-shaped square Q is generally referred to as a square since that is the term used to designate similar types of squares.

The machine D has a protractor and clutch unit 2a. A pair of straight bars form a track 2b. A straight bar 2c is supported on brackets to form another track. The track 2b can be locked to prevent it from moving, by turning the handle of the lock 2d. The unit 2a can be locked to prevent it from moving along track 2b, by turning the handle of the lock 2f.

A conventional cable-rigged, parallel straight edge may be used instead of the straight edge 2 and other parts of the machine D.

A carriage B is engaged to an L-shaped track portion of the square Q. The operator may rest his hand on the carriage B as he draws.

The operator may draw along the edges of the square Q without using a carriage B. A square Q, without a carriage, would be highly useful when used with common pencils and pens.

The square Q is shown tilted, as it can be selectively tilted to enable a draftsman to readily draw sloping lines. The tower structure sketch 3 can be drawn quickly with the aid of the square Q. When the operator uses the carriage B, as it is shown mounted on the square, he draws along the inside edges of the square Q. This arrangement allows the operator to draw two lines at right angles to each other to form a corner without moving the square Q. If the draftsman prefers to draw with the carriage B along the outside edges of the square Q, he may pivot the upper portion of the carriage to position a marking means and a scale means to the outside edge, or the carriage B may be removed from the square and be turned one hundred and eighty degrees to be reengaged with the track of the square.

FIGS. 1B, 1C, 1D, 1E, and 1F show the square Q in some other tilted and non-tilted positions that may be used to aid in drawing the sketch 3 or the like. The square Q may be inverted and be used against the opposite or near edge of the straight edge 2 if the draftsman prefers such an arrangement. As can be seen in the enlarged plan view FIG. 2, which is similar to FIG. 1A, the sketch 3 is a line diagram of a tower structure, which is a typical elevational view for structural steel plans. The left and right hand tower legs have the same slope. The slope is also called the angle, bevel, or pitch in structural drawing work. The sketch 3 has various length lines at various slopes. They are the horizontal and vertical lines, three sets of diagonal bracing lines having different bevels or slopes, and the tower legs which have another slope. All the slopes are both right and left hand. When the engineering draftsman makes shop detail drawings of such a steel tower, he must draw hundreds of structure lines, dimension lines, extension lines, and guide lines for lettering, etc., in these various slopes, by using the square Q to aid in accurately and speedily measuring and drawing these lines, accurate work on large jobs can be made quickly at low cost. The draftsman has to draw a little bit here and there to create a shop detail sketch, etc., thus this type of drawing work has a sequence which causes frequent changing of drawing procedure from one set of angles to another, as well as horizontal and vertical.

The square Q has an index arm N1 which is used to hold selective units with pins for tilting the square Q. This arrangement allows the draftsman to set-up this square Q for obtaining and maintaining all the angles, or slopes, that are to be used for drawing the tower sketch 3. Once the square Q is set up, there are simple operations to be made by the draftsman to change the position back and forth for various sets of angles and to the horizontal and vertical positions, as will be described fully hereinafter.

Figure 4:
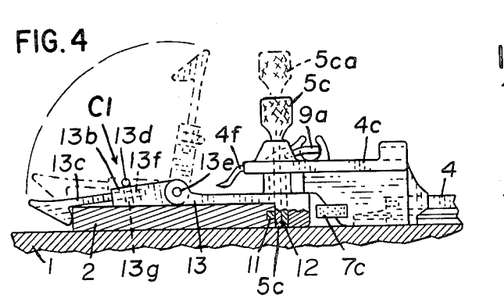
FIGURE 4 is an enlarged fragmentary sectional elevation taken along line 4—4 of FIG. 2.
Figure 9:
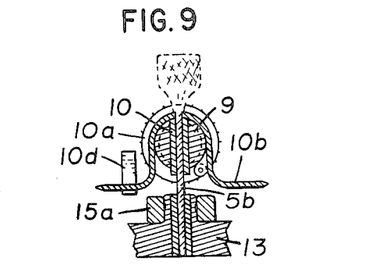
FIGURE 9 is a sectional elevation taken along line 9—9 of FIG. 8.

The square Q has a body or frame 4. The body 4 has legs 4d and 4e. Pin arms 4a, 4b, and 4c are attached to the body 4 with plugs 20 engaging sockets in the body, so as to allow them to be removed when the carriage is to be used to draw along the full length of an outside edge of the square. The pin arms have holes to take pins 5a, 5c, and 5d. These pins may be similar to the pin 5b, which is shown enlarged in FIG. 9. The pins 5a, 5c, and 5d are positioned so they may be made to bear against the edge of the straight edge 2, to adjust the square Q to various tilted positions. The pins 5a, 5b, 5c, and 5d form bearing points that can selectively bear against the edge of the straight edge 2. Normally, the pins 5a, 5c, and 5d are inserted fully, like the pin 5c is positioned as shown in FIG. 4, and allowed to remain in that position. The pins may be raised to positions like the position 5ca, shown in FIG. 4, to allow disengaging of protractor-clamps from the square Q.

The protractor-clamps C1, C2, C3, and C4, which are alike, are engaged by the pins 5a, 5b, 5c, and 5d. The clamps C1, C2, C3, and C4 are selectively coupled to the straight edge 2 to restrain the square Q from tilting out of selective tilted or non-tilted position. These protractor-clamps are slidable along the straight edge 2, even when they are clamped to it. These clamps may be omitted when the device is to be used to a limited degree, or they may be disengaged when they are not required for a given sketching operation. A typical clamp C1 is shown in enlarged elevation FIG. 4; it is a self-aligning and self-coupling clamp; the clamps will be described in detail further on.

The pins 5a, 5c, and 5d may be fixed permanently to the arms on the frame 4, and to the clamps C1, C2, and C4, if such an arrangement is preferred. When limited operations do not require the use of the clamps C1, C2, and C4, the pins 5a, 5c, and 5d may be used without the clamps. The square Q can be used to an extent without the pins by causing the partially embedded magnetic clamps 7a, 7b, and 7c to act as the outside corners, the magnetic clamps acting as bearing points and clamps. The magnetic clamps are pieces of magnetized metal such as "Alnico." The magnetic clamps may be used to hold the square Q to the straight edge 2. The edge of the straight edge 2 would have a strip of iron 11 to work with the magnetic clamps, unless the straight edge is made of steel. When the magnetic clamps are brought close to the strip of iron 11, magnetic attraction causes the clamps to bear and hold tightly against the strip 11. These magnetic clamps prevent the square Q from pulling away from the straight edge 2 while they allow the square to be slid along the edge. The magnetic clamps 7a, 7b, and 7c are offset from the edges 4g and 4m to form projections. When the pins 5a, 5c, and 5d are omitted, two of these projections along one of the edges 4g or 4m engage the edge of the straight edge 2 to space the adjacent edge 4g or 4m away from the straight edge 2 when the square Q is positioned against the straight edge in parallel relationship, such positioning providing a gap between the edge of the straight edge 2 and the adjacent edge 4g or 4m to allow the draftsman to scale and draw within the gap. When the pins 5a, 5c, and 5d are used, they act as projections in place of the clamps 7a, 7b, and 7c.

The pins may all be alike so as to be interchangeable. The pins are threaded almost their full length for engaging the pin arms and the pin holders H1, etc. The pin ends engage plain close fitting holes in the protractor-clamps. The pins may be magnetized to bind them to engaging parts of iron. The pins may then act as magnetized clamps. The resilient wire 12 extends through the clamp C1, as shown in FIG. 4. The wire 12 springs aside into a suitable groove in the protractor-clamp when a pin is inserted or removed. This wire 12 acts as a key to fit in the keyway-like groove near the bottom of the pin, to hold the pin and the protractor-clamp together. The clamps C1, C2, C3, and C4 and the arms 4a, 4b, and 4c may have hardened sleeve inserts for preventing wear and tear from the pin action.

The straight edge 2 may be used as straight edges are normally used, that is, it may be pushed up and down the drawing board 1 and the square Q may be kept against the straight edge and be slid with it and then along its length. The square Q may also be disengaged from the straight edge 2 and moved independently to a desired position along the straight edge. The ends of the frame legs 4d and 4e are beveled at about forty-five degrees so that the square Q may be tilted to forty-five degrees in arrangements similar to that shown in FIGS. 1B and 1E.

Figure 3:
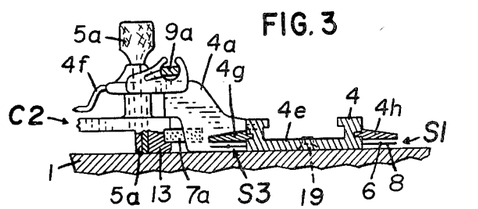
FIGURE 3 is an enlarged fragmentary sectional elevation taken along line 3—3 of FIG. 2.

As shown in FIG. 3, the frame edgings 4h and 4g are beveled on the top to allow a suitable working edge for drawing. The edgings 4k and 4m are like the edging 4h. These edgings may be transparent. The frame 4 may be made of steel or lighter weight materials, such as plastic or aluminum. It is highly desirable to have the working edges 4g, 4h, 4k, and 4m made of transparent material so the draftsman may see how close he is drawing to adjacent lines that are below the edgings. If the frame 4 is to be made of clear plastic, frame 4 and edgings 4h, 4k, 4g, and 4m may be combined and be made of one piece.

The inside edge of the square Q has the scale assemblies S1 and S2; assembly S1 is shown below the edging 4h in FIG. 3. The outside edgings 4g and 4m may have scales S3 which may be like scale S1. The scales may be made of transparent plastic. If the frame 4 and the edgings are made of aluminum or other opaque materials, the scales may be located on the top of the edgings. When the square Q is to be used only with one set of scales, such as full size scales, the scales may be marked on the top of opaque edgings. Such full size scales may be marked on the bottom or the top of a transparent frame edge. As can be seen in FIG. 3, the scale assembly S1 has a roughened reinforcement wire 6 at its center. As the plastic scale 8 would likely have a high coefficient of expansion, the wire 6, with a low coefficient of expansion, is used to restrain the plastic from expanding or contracting excessively in length. The wire 6 may be sandwiched between two pieces of plastic that are fastened together to form the base of the scale, or a single strip of plastic 8 may be used with the reinforcing wire 6 imbedded in it. Small balls 6b and 6c are attached to the ends of the wires 6, so the scales S1 and the like may be detached or attached quickly and accurately to the square Q. These balls 6b would fit into suitable sockets cast into the frame or edging at the center. The sockets are slightly smaller in diameter than the balls 6b and 6c, since the balls or the sockets are slightly resilient, thus the balls can be forced into the sockets with slight hand pressure. Each wire 6, at the outer ends of the square, has a spring 6d which keeps the scales taut. The scales S1, and the like, may be made so their graduations start at zero, where they meet at the center of the square Q, and graduate out to their ends, so that measurements may be taken in two directions from the center from one position of the square Q. In general, the scale assemblies S1 and the like would be interchangeable with scales of other graduations.

A set of scales S3, in different scale registry from that on the scales S1 and S2, would be useful at times when a sketch, for instance, is drawn with a small scale for overall sizes and a larger scale for the details.

Figure 7:
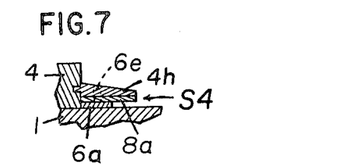
FIGURE 7 is an enlarged fragmentary sectional elevation showing a modified edge scale and its relationship to the edge of the square.

FIGURE 7 shows a modified scale assembly S4. The plastic scale 8a is cemented to the metal strip 6a. Two or more dowels 6e in the strip 6a are pressed into holes in the edge 4h and the like. Dowels 6e engage dowel holes in an edging 4h that is made of transparent plastic. The holes are slightly smaller in diameter than the dowels 6e, since such transparent plastic as the edge 4h is slightly resilient and the dowel can be forced into the holes with slight hand pressure. The scale assembly S4 may be quickly removed from the edge 4h by prying it loose with a ruling pen blade, by making several insertions and twists with the blade. The metal strip 6a takes the friction forces and protects the scale 8a.

Figure 5:
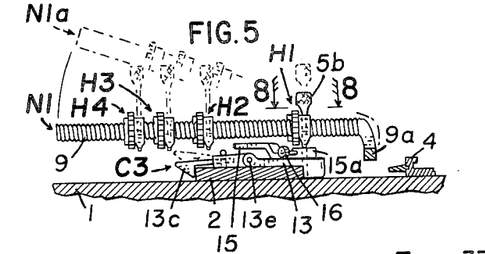
FIGURE 5 is a fragmentary sectional elevation taken along line 5—5 of FIG. 2.
Figure 6:
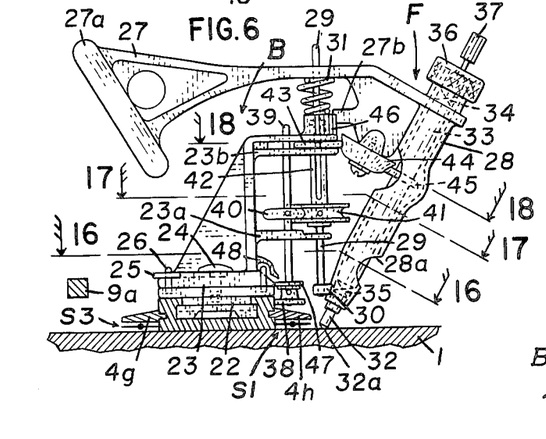
FIGURE 6 is an enlarged fragmentary sectional elevation taken along line 6—6 of FIG. 2.

The pin 5b is held in the pin holder H1 (see FIGS. 2 and 5). There is a means to accurately set the pin holder H1 so as to create an indexed location to aid in quickly and accurately obtaining the desired tilted position for the square Q for a drawing operation at an angle or slope. This will be described in detail further on. Other identical pin holders H2, H3, and H4 are shown. They are all attached and selectively positioned to the index arm N1 for the various slopes or angles required for drawing the sketch 3. The pin 5b projects down, as does the pin 5c, so that it can be made to bear against the edge of the straight edge 2. The pin 5b is located at a position which is equidistant from the pins 5a and 5c. With the pin 5c and the pin 5b bearing against the straight edge 2, as shown in FIG. 2, an angle or bevel is created between the straight edge 2 and the bottom leg of the square Q. This tilt of the square Q creates the proper slopes for measuring and drawing the left hand leg of the tower shown in the sketch 3. The tower leg is drawn along the leg 4d of the square Q. The leg 4e of the square Q is sloped at an angle complementary to the angle created by the leg 4d. This sloping leg 4e is used in the drawing of the extension lines out from the left hand tower leg, so they suit the dimension lines that are drawn parallel with the tower leg. After the left hand leg of the tower in the sketch 3 is drawn, or partially drawn, the square Q may be pivoted or rocked on pin 5b until pin 5a bears against the straight edge 2. This position is shown in FIG. 1B. It creates the same degree angles that were created in the arrangements shown in FIGS. 1A and 2, except that they are opposite hand or reversed in respect to the legs of the square Q. With the set-up shown in FIG. 1B, the right hand leg of the tower can be measured and drawn along the leg 4d of the square Q; and any dimension lines can also be drawn along the leg 4d, with extension lines or dimension lines being drawn at right angles with the leg 4e of the square. Thus it can be seen that with the pin 5b indexed in index arm N1, the draftsman can draw these two sets of slopes by quickly changing back and forth from one set of complementary slopes to another merely by rocking the square Q with the pin 5b bearing against the straight edge 2.

When the draftsman wants to draw the horizontal and vertical lines in the tower in the sketch 3, the pin 5b may be removed or raised so that it no longer engages the protractor-clamp C3 and the straight edge 2; or the index arm N1 may be removed temporarily if desirable, particularly while consecutively drawing a great many horizontal and vertical lines. The square Q is positioned as shown in FIG. 1C by rocking or pivoting it until the pins 5a and 5c both bear against the straight edge 2. Then the horizontal lines can be measured and drawn along the leg 4e, and vertical lines can be measured and drawn along the leg 4d. The position of the square Q, as shown in FIG. 1C, is considered to be the most desirable arrangement for drawing vertical and horizontal lines by a right handed draftsman. Since the square Q is used to measure and draw, it is highly desirable at times to pivot the square Q to the position shown in FIG. 1D, with the pins 5c and 5d bearing against the straight edge 2. With this arrangement, the draftsman may measure and draw the vertical and horizontal lines from a common point when it is more suitable for the sketching being done. Thus, it will be seen that even a right handed draftsman will use the square Q in the position shown in FIG. 1D to allow him to draw and scale at the same time. A left handed draftsman would find the positions of the square Q as shown in FIGS. 1D, 1E and 1F highly desirable for his technique.

To use the square Q in the positions shown in FIGS. 1E and 1F, the index arm N1 is unhooked from the frame leg 4e, where it is hinged, and is moved to the position shown by a dot-dash index arm outline N2 on the leg 4d. The square Q is tilted as shown in FIG. 1E, by having the pins 5b and 5d bear against the straight edge 2. The draftsman, whether he is left or right handed, takes his choice whether he wants to use the square Q in positions such as shown in FIGS. 1A and 1B or in the positions shown in FIGS. 1E and 1F. All draftsmen would, at times, switch the index arm N1 to give the alternate arrangement when conditions would require it, such as when he is sketching near the ends of the straight edge 2. The pin holders H1, etc., can be indexed in the index arm N1 to give up to a 45 degree tilt for the flat angles to the horizontal, which is all that is necessary, since the complementary angles on the other leg of the square give the steep angles to the horizontal, from forty-five degrees to ninety degrees. The pins and straight edge means or the like that maintain the square Q into a set position as it is swept over a drawing is defined as an angular positioning means, since it can be used to set the square at any angle from ninety degrees or zero degrees to forty-five degrees.

Another index arm, identical to the index arm N1, may be used in the position N2. Either one or both of them may be attached at the same, if so desired. In general, one would be removed to keep down the weight and to make the device non-cumbersome.

When the draftsman wants to draw the top set of bracing of the tower in the sketch 3, he removes the pin 5b from the pin holder H1, and inserts it in the pin holder H2, which has or is adjusted to give the proper angle or tilt. With this tilt, one diagonal brace and the dimension lines for it may be drawn against the leg 4e of the square Q; and the lines drawn to complementary slopes or angles would be drawn against the leg 4d of the square. After this operation, the square Q is rocked or pivoted on the pin 5b against the straight edge 2 to the opposite position. This would allow the other top diagonal brace in the tower to be drawn. After the top set of bracing has been drawn, or partially drawn, on the tower 3, the pin 5b is removed from the holder H2 and inserted into the holder H3 until it projects far enough to allow it to bear against the straight edge 2, then the middle set of diagonal bracing may be drawn or parts of it may be drawn. Then the pin 5b may be removed and inserted into the holder H4, so it can be made to bear against the straight edge 2. Thus the square Q can be tilted to enable the draftsman to draw the lower set of the bracing on the tower 3.

Although I have referred to the pin 5b as being removed from the pin holder H1 and inserted in other pin holders, pins identical to the pin 5b may be inserted in the pin holders H2, H3, and H4 to make them quickly available. When not being used, these pins would be kept in a raised position, such as that which is shown by a dot-dash pin outline above the pin 5b in FIG. 5. They are raised enough to prevent them from engaging the protractor-clamp C3 or from bearing against the edge of the straight edge 2. If a tower similar to that shown in the tower sketch 3 were to have more diagonal members, or details of diagonal connections to adjoining parts, more pin holders, similar to the holder H1, may be fastened and positioned to the index arm N1, or other such index arm, so as to provide all the required indexed angles.

The index arm N1 has a T-shape. The arm 9 is connected to the center of the beam 9a. The ends of the beam 9a have hinged connections to the pin arms 4a, 4b, and 4c. The hinge sockets on the pin arms are open at the top to allow the ends of the beam 9a to be engaged or disengaged from the pin arms.

The index arm N1 is inserted from a vertical plane to allow it to fit into the hinges, then it is pivoted down into a horizontal position which locks it in place. The index arm N1 may be raised and lowered, by pivoting, to nearly a vertical position without unhinging. A raised position of the arm N1 is shown by the dot-dash outline N1a in FIG. 5. The arm N1 may be pivoted to this raised position N1a to retract the pin 5b from its engagement with the edge of straight edge 2 while the square Q is being pivoted from a tilted position to a non-tilted position. When the arm N1 is to pivot to retract the pin 5b, the catch arm 13c may be locked into a raised position indicated by a fragmentary dot-dash outline. The mounting of the index arm N1 allows the adjacent edging 4g to be used fully for scaling and drawing with a common pencil and the like, when the index arm is attached. The threaded arm 9 is rigidly joined to the beam 9a. The pin arms 4a, 4b, and 4c have hinge sockets to which the ends of the beam 9a are engageable. This offsetting of the index arm N1 creates a gap along the edge 4g, therefore allowing unobstructed drawing and scaling along the edge.

Figure 8:
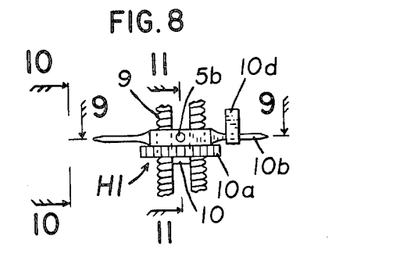
FIGURE 8 is an enlarged fragmentary plan view taken along line 8—8 of FIG. 5.
Figure 12:
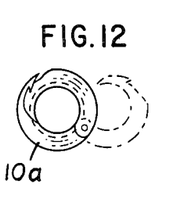
FIGURE 12 is an enlarged detail of a typical nut used to position the pin holders on the index arm.
Figure 13:
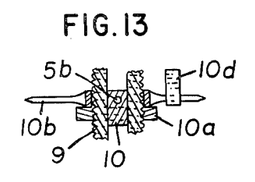
FIGURE 13 is a fragmentary sectional plan view taken along line 13—13 of FIG. 10.

The arm 9 is threaded and slotted to allow the pin holder H1 and the like to be attached to it and be adjusted laterally along it. The pin holder H1 has a pin retainer 10, an adjusting nut 10a, an indicator 10b, and an elastic lock block 10c. The retainer 10 is threaded to suit the pin 5b. The indicator 10b is soldered to the retainer 10. The nut 10a is made in parts and hinged together, as shown in FIG. 12. The retainer 10 is inserted in the slot in arm 9 at approximate position where the pin 5b is to be positioned. The nut 10a is opened and clamped around the arm 9 and the retainer 10, locking the retainer to the arm. The nut 10a has a hook and notch engagement to lock the nut into a circle when the nut segments are pressed together. The nut 10a is made of spring steel or the like to allow its parts to be sprung. The pin 5b is inserted into the retainer 10. The nut 10a is rotated to obtain vernier adjustment to position the retainer 10 laterally with respect to the edge 4g and thus selectively vary the distance between the edge 4g and the pin 5b to obtain selective tilting of the square Q. The retainer 10 is grooved, but not threaded, to receive the nut 10a. The groove and nut engage to lock the parts together. The indicator 10b has a needle pointer at each of its ends; the pointers register the tilt angle on the protractor-clamp C3. The small elastic block 10c is held by a recess in the bottom of the retainer 10. The elastic block 10c bears against a small area of the thread of the nut 10a, preventing the nut from creeping from vibration. A paper tab 10d may be attached to the indicator 10b with an adhesive. The tab 10d is useful to write the angular setting for the position of the pin holder H1. The nut 10a is turned by gripping it with the fingers. The pin holders H1, etc., are narrow to allow them to be set close together for indexing angles that are slightly different. The head of pin 5b is shown by a dot-dash outline in FIGS. 9 and 10, as FIG. 8 does not include the pin head. The pin 5b is inserted in the hole in the retainer 10 after the pin holder H1 has been clamped to the arm 9. The pin 5b and the retainer 10 may be threaded steeply to allow the pin to be quickly advanced, to thus allow it to be quickly inserted or removed with little effort and without jarring or moving the square Q and the straight edge 2 it may be clamped to.

The square Q may be lifted by gripping a threaded pin 5b and, in doing so, the pin may be turned to advance it further so it will project to allow it to bear against the straight edge 2, either with or without the protractor-clamp C3. The threaded pin 5b may be turned in the opposite direction to raise it so it will no longer project to engage the straight edge 2 or the clamp C3. The pin 5b may be non-retractable from the arm 9, the arm 9 being pivoted upwards to retract the pin 5b from engagement with the edge of the straight edge 2, or the arm 9 may be removed to retract the pin 5b.

The protractor-clamps C1, C2, C3, and C4 may be used when it is desirable; and they may be omitted or disengaged by removing or raising the pins 5b, etc., when they are not being used. Some types of drafting work would not require the protractor-clamps. Some types of work would not require the clamps but would make use of the protractors. The clamps may be used to securely hold the square Q in an inverted position to the lower edge of a straight edge 2, particularly so on a vertical or steeply sloped drawing board. The clamps C1, C2, C3, and C4 hold the square Q to the straight edge 2 when pressure on the edge of the square Q while drawing would have a tendency to tilt it. The clamps C1, C2, C3, and C4 are slidable along the straight edge 2 even when clamped to it. The protractor-clamp C1 is shown enlarged in FIG. 4; the other clamps may be identical or similar to it. The protractor indicator needles 4f point to both the angles on the protractor for the set-up on the square, that is an angle and the complementary angle at right angles to it. Protractor part 13 of the protractor-clamp C1, and the like, may be made of such material as plastic or aluminum to keep the weight low; or they may be magnetized metal, such as aluminum-cobalt-nickel alloy such as sold under the trade-mark "Alnico," to hold it to an iron edged straight edge or other iron or steel edged guides. The protractor part 13 has a hinged arrangement with a hinge part 13b, and a threaded catch arm 13c. The thread shaft of arm 13c is rectangular to fit rectangular holes in hinge part 13b so the arm cannot turn.

The effective length of the arm 13c is varied by the draftsman to allow the clamp to fit the width of his straight edge 2. This adjustment is made by turning the threaded nut-like part 13g. The nut-like part 13g is tapped to suit the thread on arm 13c; it has spaced holes around its perimeter for attaching the lever-like handle 13d. After the effective length of the arm 13c is adjusted to suit a particular straight edge 2, the lever-like handle 13d is inserted in one of the spaced holes in part 13g. A thin resilient washer 13f around the arm 13c prevents the nut 13g from creeping. The handle 13d is pivoted from right to left to tighten the clamp C1 and it is pivoted from left to right to loosen the clamp C1 in its relation to the straight edge 2 to adjust for play. The handle 13d is pivoted to the extreme tightening position when it is desirable to tighten the clamp C1 to the straight edge 2 so it will not slide, which is useful in keeping the square Q positioned for drawing vertical lines longer than the leg of the square. The hinge arrangement formed by the protractor 13 and the hinged part 13b has a machine screw 13e. This machine screw 13e may be tightened with a screw driver when it is desirable to prevent any hinge action. As shown in FIG. 4, the non-threaded end of the arm 13c is beveled. This allows the arm 13c to engage the straight edge 2 and the loose hinge action allows the arm 13c to rise and slide over top of the straight edge 2, and then to drop to engage straight edge 2 securely as shown. When the arm 13c is to engage the straight edge 2 after sliding over top of it, the weight of the arm 13c and a loose hinge arrangement will slow the arm 13c to drop and the hook-like end of arm 13c will bear against the straight edge 2, preventing the protractor-clamp C1, etc., from disengaging in a lateral direction, thus locking the square Q in a position with the straight edge 2 by means of this clamp or other combinations of the protractor-clamps C1, C2, C3, and C4. A slightly raised dot-dash outline of the arm 13c and the hinge part 13b, shown in FIG. 4, shows the elevated positions of these parts when they are sliding across the top of the straight edge 2. The protractor-clamps C1, etc., are self-aligning when they move against the edge of the straight edge 2, unless they are over ninety degrees from their selected position. The arm 13c and the hinge part 13b to gether are raised up pivotally to slightly over ninety degrees to keep them disengaged from the straight edge 2 when they are not wanted in play to clamp onto the straight edge 2. This high raised position of the arm 13c and the hinged part 13b is shown by a dot-dash outline in FIG. 4. To raise the arm 13c, the draftsman may insert his finger under the sloping end of the arm 13c and pull the arm 13c upwardly.

The index arm N1, as shown in FIG. 2, would at times prevent the full hinging action of the arm 13c and the hinge part 13b on clamp C3, as they would be blocked by the arm 9 and the pin holders. When that condition occurs, the pin 5b may be disengaged from the clamp C3 or the index arm N1 and the protractor-clamp C3 together. When this blocking condition occurs, the screw 13e may be tightened to prevent hinging action, and the arm N1 may be lifted, which will lift the clamp C3 also.

The clamp C4 may be disengaged and pushed aside when it is not being used, or the clamp C2 may be switched to the position of the clamp C4, if it is not being used on the arm 4a, thus eliminating a clamp. Thus, when the engineering draftsman wants to keep the weight of the square Q to the minimum, this switching arrangement is used. If weight is no problem, or if it is preferred, a clamp C4 may be used while the clamp C2 is left on the arm 4a.

Figure 10:
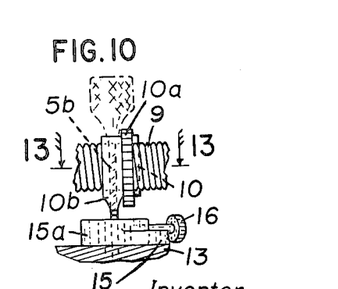
FIGURE 10 is a fragmentary sectional elevation taken along line 10—10 of FIG. 8.
Figure 11:
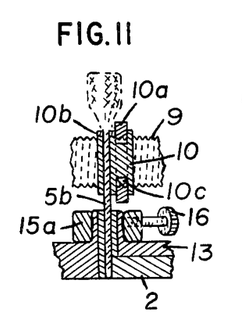
FIGURE 11 is a fragmentary sectional elevation taken along line 11—11 of FIG. 8.

The spacer E, shown in FIG. 2, allows the draftsman to accurately and speedily space cross hatch lines and surface shading lines. Since cross hatch lines are sloped differently for each member shown in complex sectional views, the index arm N1 with its means for multiple indexing of sets of slopes, including right and left hand sets of slopes, coacts with the spacer E to allow the draftsman to rapidly make many different sets of such lines. Sloping, vertical, and horizontal shading lines can also be uniformly spaced more rapidly when the square Q includes a spacer E. The spacer E has a clamp or anchor 14 that bears against the straight edge 2 like protractor part 13 bears. Protractor-clamp parts 13b, 13c, 13d, 13e, and 13g are assembled with the clamp 14 so that it can be clamped tightly or loosely to the straight edge 2 or be uncoupled. The handle 13d is manipulated to tighten the clamp 14 to prevent it from moving when drawing uniformly spaced lines. The spacer bar 15 is a stiff member having uniformly spaced, countersunk, index holes 15b. The bar 15 is fastened to the collar of the clamp part 13 with a set screw 16, as shown in FIGS. 10 and 11. The bar 15 may be selectively skewed to vary the angularity between it and the straight edge 2, to vary the distance from one hole 15b to the next hole, the distance being measured parallel to the edge of the straight edge 2. This distance is the same as the spacing to be drawn from one cross hatch line to another and the like. The protractor of the protractor clamp C3 can be used to set the angularity of the bar 15 to suit a tabulation for such settings. The set screw 16 is tightened to maintain the angularity of the bar 15. The collar of the clamp part 13 may be notched or recessed every five degrees to allow the angularity to be varied by five degree units and to allow the set screw 16 engage a notch to prevent slippage. The clamp C3 is loosely clamped so it can slide on the straight edge 2 while drawing lines with the aid of the spacer E.

Figure 14:
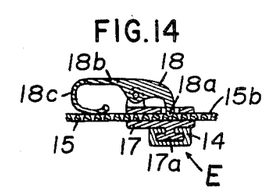
FIGURE 14 is a fragmentary sectional elevation taken along line 14—14 of FIG. 2.
Figure 15:
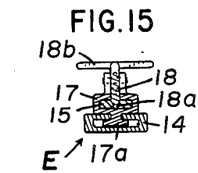
FIGURE 15 is a fragmentary sectional elevation taken along line 15—15 of FIG. 2.
Figure 16:
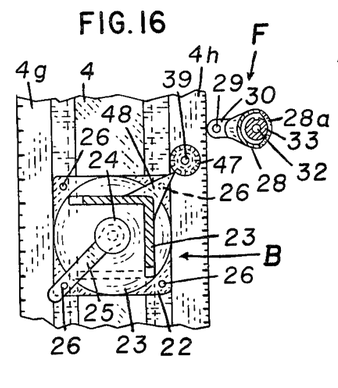
FIGURE 16 is a fragmentary plan view taken along line 16—16 of FIG. 6.
Figure 17:
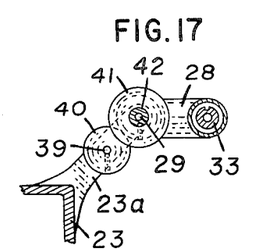
FIGURE 17 is a fragmentary sectional plan view taken along line 17—17 of FIG. 6.
Figure 18:
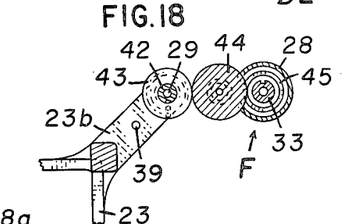
FIGURE 18 is a fragmentary sectional plan view taken along line 18—18 of FIG. 6.

The slider 17 slides on the spacer clamp 14 and the bar 15. The slider bottom 17a loosely holds the slider 17 to the groove in the spaced clamp 14, as shown in FIGS. 14 and 15. The spacer control or rocker 18 is pivotally mounted on the slider 17. The control 18 has an index pin portion 18a that is engageable to the index holes 15b. The control 18 has a wide key-like portion 18b that is pressed downwardly to cause the pin 18a to retract from a hole 15b. The draftsman can grip the underside of the bar 15 and the top of the key 18b to pressure the key 18b downwardly. A spring portion 18c tends to force the pin 18a into the closest hole 15b when the hand pressure is released. When a set of cross hatch lines are to be made, the draftsman tightly clamps the clamp 14 close to the loosened clamp C3, then he moves the slider 17 and control 18 until he manipulates the pin 18a into the hole 15b closest to the clamp C3, then he draws the first line along an edge of the square. He then presses the key 18b and moves the square to the right slightly and releases the pressure on the key 18b so the pin 18a engages the next hole 15b. Then, the next line is drawn. Additional lines are drawn by repeating these control movements.

The holes 15b are countersunk to help center the pin 18a when the pin is not perfectly aligned before it is released. The draftsman may insert the pin 18a in every other hole 15b when wide uniform spacing is to be made. The draftsman may shift the spacer E and the clamp C3 by removing a clamp C1, C2, or C4, and shifting the clamp C3 to its place. When the spaced lines are to have a slight slope such as that along the edge 4h, the draftsman may pivot the straight edge 2 downwardly ninety degrees by manipulating the controls of the protractor 2a, then drawing the spaced lines more easily along the edge 4k. When the work being done does not require cross hatch lines and surface spacing lines, the spacer E may be removed by raising the pin 5b and sliding the spacer aside and substituting another clamp in place of clamp C3.

Since cross hatch lines and shading lines are used to a large extent on fine ink drawings such as patent drawings and the like, three countersunk machine screws 19 may be adjusted to project their heads slightly below the body 4 to raise the body 4 above the drawing surface so the body will clear the ink lines to prevent smearing the lines. When the body 4 is raised slightly and moved over a drawing surface, it would not smear pencil lines and the like.

The clip 21, shown on the left end of leg 4e, is a conventional drafting machine scale clip that allows the square Q to be connected to conventional drafting machines.

The carriage B may be used to aid the draftsman in measuring and drawing along the edges 4h, 4k, 4g, and 4m. The carriage B has a slidable base 22 that slides along the L-shaped track formed by the body 4. The carriage has an upper frame 23 that may pivot about the pin or machine screw 24 which secures the frame 23 to the base 22. A spring indexing bar 25 is also fastened to the frame 23 with the pin 24. Each corner of the base 22 has an index pin 26 projecting upwardly. The bar 25 is positioned in recess in the frame 23. The outer end of the bar 25 projects outwardly slightly from the frame 23. The outer end of the spring bar 25 has a hole which engages one of the index pins 26. The frame 23 may be pivoted by bending the end of the spring 25 upwardly to disengage it from the pin 26, then by pushing the bar 25 laterally until another index pin 26 is selectively engaged by lowering the end of the bar 25 so it engages the pin 26 selected.

The carriage B may have a pivot arm F. The arm F has a pivot arm frame 27. The frame 27 has a gripping portion or handle 27a. The draftsman grips the handle 27a or a tubular holder or shell 28. The holder or shell 28 is fastened to the frame 27 by welding or other means. A vertical pin 29 engages the top of the frame 27. The bottom of the pin 29 is secured to the hole in the plate or offset 30 and fastened so it will not rotate in the hole. The plate 30 is welded to the holder 28. The frame offset 23a has a hole that acts as a bearing for the pin 29. A spring 31 tends to raise the arm F. The draftsman pressures the arm F downwardly while drawing, which action causes the conical marker 32 to bear against a drawing surface on the board 1. The marker 32 may be of graphite lead and the like, or a porous metal marker that feeds ink through the conical surface. The line of contact 32a of the conical tip of the marker 32 marks the drawing surface to form lines of selective width, or selective lines that contrast with each other. The marker 32 is gripped by a mechanical pencil holder 33. Bearings 34 and 35 allow the pencil holder 33 to be rotated within the shell 28. A removable cap 36 is fastened with a bayonet fitting or the like to the top portion of the shell 28. The cap 36 holds the holder 33 in position and it allows the holder to be removed. The holder 33 has an extension 37 which is gripped and turned to advance the marker 32. The lower portion of the holder 33 may be gripped through the opening 28a in the holder 28 when turning the extension 37. The marker 32 must be rotated to dress the conical tip when it is made of pencil graphite and the like.

A porous marker of metal is rotated to wipe ink off the conical surface to cause the ink to form lines. The marker 32 may be made to rotate by rotation of the wheel 38 to which it is interconnected. The wheel 38 is keyed to the shaft 39. Holes in the offsets 23a and 23b act as bearings for the shaft 39. When the arm F is lowered to the position shown, the wheel 38 engages the vertical edge of the body 4. When the carriage B is pushed, the wheel 38, bearing against the body 4, is forced to rotate by the friction. The wheel 38 may have a rubber rim to allow it to grip the body 4 without slipping.

A round edged wheel 40 is keyed to the shaft 39 with a set screw. The wheel 40 engages and drives the flanged wheel 41. The wheel 41 is fastened to the tube 42 with a set screw. The tube 42 rotates on the shaft 29. A collar below the tube 42, and another collar above the tube, are soldered or otherwise fastened to the shaft 29 to hold the tube 42 in position. A hole in the offset 23b acts as a bearing for the tube 42. When the arm F is raised, the flange on the wheel 41 grips the wheel 40, causing the wheel 40, the shaft 39, and wheel 38 to rise. The flanged wheel 41 also pushes the wheel 40 downwardly, along with the shaft 39 and wheel 38, when the arm F is pressured downwardly. The wheel 43 has a set screw that engages and slides in a keyway in the tube 42. The wheel 43 drives the beveled wheel 44. The wheel 44 drives the beveled wheel 45. The wheel 45 is keyed to the holder 33. Wheels 40 and 44 may have rubber-like rims to prevent slipping.

A gear-like part 46 is welded or otherwise fastened to the top of offset 23b. The wedge or tooth-like portion 27b of the arm frame 27 can be made to selectively engage the gear-like part 46. The offset 23b and the gear-like part 46 form a pivot angle indexing means to allow the arm F to be selectively pivoted to make selective width lines. My Patents No. 2,701,417 and No. 3,020,640 describe rotating tilted conical tipped markers thoroughly, also other markers suitable for the carriage B.

A rotary scale 47 is tightly engaged to the top of the wheel 38 so the scale rotates when the wheel rotates. The scale 47 has graduation markings for an inch. The indicator 48 on the frame 23 coacts with the scale 47.

The scale 47 can be set with the zero graduation marking at the indicator 48 by partially lowering the arm F so the wheel 38 bears slightly against the edge of the body 4, then the carriage B can be moved slightly until the zero graduation marking lines up with the indicator 48, then the arm F can be raised and the carriage can be moved to a position selected to start drawing and measuring a line. The circumference of the wheel 38 is one inch, so that one inch of movement of the carriage B causes the scale 47 to rotate once. When a long line is to be measured, the draftsman counts the number of revolutions of the marker 47 to determine the distance measured. The scale 47 is highly suitable for measuring the numerous short lines that form the details of most drawings. The draftsman using the scale 47 would usually use the scaled edges 4g, 4h, 4k, and 4m for measuring long dimensions.

The scale 47 may be removed and be interchanged with another scale such as one having graduation markings of one inch being equal to one foot.

Figure 19:
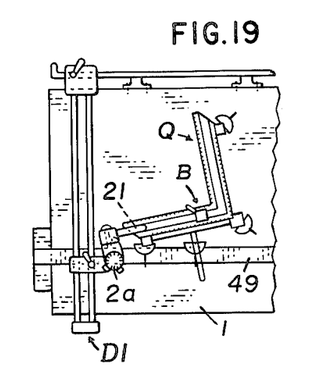
FIGURE 19 is a plan view similar to FIG. 1A but showing the drafting machine coupled differently to a conventional drafting machine.

FIG. 19 shows a modification having the square Q attached directly to the protractor 2a with the clip 21. The drafting machine D1 is like the machine D. The T-square 49 may be used to set the square Q to an angle with the index arm, then the clutch of the protractor 2a is engaged to maintain the tilt of the square Q. The T-square 49 can then be removed until needed again to make another angular setting of the square Q.

Figure 20:
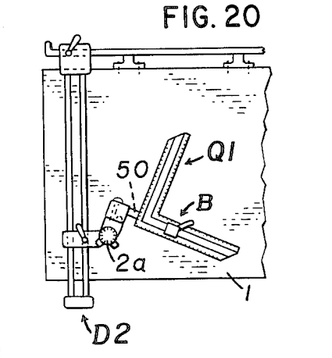
FIGURE 20 is a plan view similar to FIG. 1A showing a modification of the drafting machine used in conjunction with parts of a conventional drafting machine.

The modification shown in FIG. 20 has a square Q1, which is similar to the square Q. It differs by having a connector 50 near its center to engage the protractor 2a of the drafting machine D2. The machine D2 is similar to the machine D. The square Q1 does not have the pin arms 4a, 4b, and 4c attached. The square Q1 with the improved carriage B would make a highly useful combination. The carriage B can be used conventionally along the top edge of the horizontal leg of the square and be switched to mark along the left edge of vertical leg of the square.

Thus it will be seen that I have provided an economical and efficient drafting machine capable of performing a wide variety of operations.

While I have illustrated and described several embodiments of my invention, it will be understood that these are by way of illustration only, and that various changes and modifications may be made within the contemplation of my invention and within the scope of the following claims.

I claim:

1. A drafting instrument comprising an L-shaped square means, said L-shaped square means having an L-shaped track means, said L-shaped track means formed by intersection straight track portions, a carriage means mounted on said L-shaped track means, a marking means mounted on said carriage means, said carriage means including a wheel means engageable with said L-shaped track means, said wheel means including rotary scale markings so that movement of said carriage means along with coordinated movement of said marking means causes said scale markings to rotate to indicate the length of line drawn along said L-shaped track means, whereby lines can be drawn and scaled simultaneously and rapidly with ease.

2. A drafting instrument as recited in claim 1 wherein said L-shaped square means consists of a single L-shaped square and wherein said carriage means consists of a single carriage.

3. A drafting instrument as recited in claim 2 together with angular positioning means to maintain said L-shaped square means in a predetermined angular position as it is swept over a drawing surface, whereby sloped lines can be drawn and scaled simultaneously with ease.

4. A drafting instrument as recited in claim 2 together with straight edge means in contacting relaionship wih said L-shaped square means.

5. A drafting instrument as recited in claim 2 wherein said L-shaped square means includes an inner edge and an outer edge, and wherein said carriage means includes transferable means to selectively position said marking means and said rotary scale markings adjacent to said inner edge or adjacent to said outer edge and vice versa.

6. A drafting instrument as recited in claim 2, said marking means including a marking element having a substantially conical tip rotatable about its own axis and beng supported at an acute angle with respect to a drawing surface, so as to provide line bearing contact therewith along the entire length of the conical surface of said tip, said wheel means interconnected with said marking element to cause said marking element to rotate when said carriage means is moved, said marking element being pivotable laterally in response to control movements, whereby lines of selective width can be drawn and scaled rapidly with ease.

7. A drafting instrument as recited in claim 2 wherein said marking means includes selective means to make lines which contrast with each other, whereby lines that are easily distinguished from one another can be drawn and scaled rapidly with ease.

8. A drafting instrument as recited in claim 2 wherein said marking means includes means to make selective width lines, whereby lines that differ can be made and scaled rapidly with ease.

9. A drafting instrument as recited in claim 3 wherein said angular positioning means includes conventional drafting machine track means, whereby sloped lines can be scaled as drawn.

10. A drafting instrument as recited in claim 4 wherein said L-shaped square means includes clamping means slidably engageable with said straight edge means, whereby said L-shaped square means can slide alongside of said straight edge means to maintain alignment.

11. A drafting instrument as recited in claim 4 together with an indexing arm means and wherein said L-shaped square means includes two legs, and indexing arm means having pin means equidistantly spaced between two bearing points along the outside of one of said legs of said L-shaped square means, said pin means being selectively positioned along said index arm means so as to vary the angularity between said L-shaped square means and said straight edge means, whereby left and right sets of sloped lines can be drawn with one selective indexing and can be automatically scaled.

12. A drafting instrument as recited in claim 8 wherein said marking means consists of a single marker, whereby lines that differ can be drawn and scaled at low cost.

13. A drafting instrument as recited in claim 8 together with straight edge means in contacting relationship with said L-shaped square means.

14. A drafting instrument as recited in claim 12 together with angular positioning means to maintain said L-shaped square means in a predetermined angular position as it is swept over a drawing surface, whereby sloped selective width lines can be drawn and scaled rapidly with ease.

15. A drafting instrument as recited in claim 13 wherein said marking means consists of a single marker.

16. A drafting instrument as recited in claim 14 wherein said angular positioning means includes conventional drafting machine track means.

17. A drafting instrument as recited in claim 15 together with an indexing arm means, and wherein said L-shaped square means includes two legs, said indexing arm means having pin means equidistantly spaced between two bearing points along the outside of one of said legs of said L-shaped square means, said pin means being selectively positioned along said index arm means so as to vary the angularity between said L-shaped square means and said straight edge means, whereby left and right sets of sloped selective width lines can be drawn with one selective indexing and can be automatically scaled.

18. A drafting instrument comprising a straight edge means, an L-shaped square means movable with respect thereto and in continuous contact therewith, said L-shaped square means consisting of a single L-shaped square, said L-shaped square means including an L-shaped track means, carriage means mounted on said L-shaped track means, marking means mounted to said carriage means, said L-shaped square means including spacer clamp means selectively clamped along the length of said straight edge means, said spacer clamp means including indexing means and including spaced means to selectively anchor said spacer clamp means to said L-shaped square means, whereby uniformly spaced lines can be drawn with ease.

19. A drafting instrument as recited in claim 18 together with angular positioning means to maintain said L-shaped square means in a predetermined angular position as it is swept over a drawing surface, whereby uniformly spaced angularly disposed lines can be drawn with ease.

20. A drafting instrument as recited in claim 18 wherein said marking means includes means to make selective width lines, whereby uniformly spaced selective width lines can be made rapidly with ease.

21. A drafting instrument as recited in claim 20 together with angular positioning means to maintain said L-shaped square means in a predetermined angular position as it is swept over a drawing area, whereby fine uniformly spaced angularly disposed lines can be drawn with ease.

22. A drafting instrument as recited in claim 21 wherein said angular positioning means includes conventional drafting machine track means, whereby said L-shaped square means can be quickly positioned at any angularity, so as to rapidly and easily draw fine uniformly spaced sloping lines.

23. A drafting instrument as recited in claim 22 wherein said angular positioning means includes an indexing arm means having means to make sets of selective right and left sloped lines with one indexing setting, whereby oppositively sloped sets of uniformly spaced fine lines can be drawn rapidly.

24. A drafting instrument comprising an L-shaped square means, said L-shaped square means having an L-shaped track means, said L-shaped track means being formed by intersecting straight track portions, a carriage means mounted on said L-shaped track means, a marking means mounted on said carriage means, said marking means including a marking element having a substantially conical tip rotatable about its own axis and being supported at an acute angle with respect to a drawing surface, so as to provide line bearing contact therewith along the entire length of the conical surface of said tip, said carriage means including a wheel means engageable with said L-shaped track means, said carriage means includes a control arm, and means responsive to movement of said control arm to pivot said marking element supporting means about a perpendicular axis to vary the width of line drawn, said wheel means interconnected with said marking means to cause rotation of said marking means while drawing.

25. A drafting instrument as recited in claim 24 together with straight edge means in contacting relationship with said L-shaped square means.

26. A drafting instrument as recied in claim 24 together with angular positioning means to maintain said L-shaped square means in a predetermined angular position as it is swept over said drawing surface.

27. A drafting instrument as recited in claim 26 together with straight edge means in contacting relationship with said L-shape square means and wherein said L-shaped square means includes two legs, said angular positioning means in indexing arm means, said indexing arm means having pin means equidistantly spaced between two bearing points along the outside of one of said legs of said L-shaped square means, said pin means being selectively positioned along said index arm means so as to vary the angularity between said L-shaped square means and said straight edge means, whereby left and right sets of sloped lines of selective width can be drawn with one selective indexing.

28. A drafting instrument as recited in claim 27 wherein said pin means includes a plurality of pin holders selectively spaced along said indexing arm means, whereby a plurality of angular positions many be selected to allow drawing of numerous differently sloped lines.

29. A drafting instrument comprising a straight edge means, an L-shaped square means movable with respect thereto and in continuous contact therewith, said L-shaped square means consisting of a single L-shaped square having two legs, said L-shaped square means including spacer clamp means selectively clamped along the length of said straight edge means, said spacer clamp means including indexing means and including spaced means to selectively anchor said spacer clamp means to said L-shaped square means, angular positioning means to maintain said L-shaped square means in a predetermined angular position as it is swept over a drawing surface, said angular positioning means includes an indexing arm means, said indexing arm means having pin means equidistantly spaced between two bearing points along the outside of one of the legs of said L-shaped square means, said pin means being selectively positioned along said index arm so as to vary the angularity between said L-shaped square means and said straight edge means, whereby left and right sets of uniformly spaced sloped lines can be drawn with one selective indexing.

30. A drafting instrument as recited in claim 29 wherein said pin means includes a plurality of pin holders selectively spaced along said indexing arm means, whereby a plurality of angular positions may be selected and whereby numerous sets of differently sloped uniformly spaced cross hatching lines can be drawn quickly with little effort.

References Cited by the Examiner

FOREIGN PATENTS

| | | |
|---|---|---|
| 382,557 | 12/1907 | France. |
| 239,397 | 10/1911 | Germany. |
| 803,342 | 4/1951 | Germany. |

ISAAC LISANN, *Primary Examiner.*

H. N. HAROIAN, *Assistant Examiner.*